United States Patent [19]

Blackmon et al.

[11] Patent Number: 5,054,039

[45] Date of Patent: Oct. 1, 1991

[54] DIGITAL CALIBRATION CIRCUIT EMPLOYING COMPOSITE SINE WAVE SIGNALS

[75] Inventors: Fletcher A. Blackmon, New Bedford; Robert J. Reid, Fall River, both of Mass.

[73] Assignee: The United States of America as represented by the Secretary of the Navy, Washington, D.C.

[21] Appl. No.: 574,869

[22] Filed: Aug. 30, 1990

[51] Int. Cl.$^5$ ............................................. G06F 1/02
[52] U.S. Cl. ........................................ 377/42; 328/14; 364/718
[58] Field of Search ............................ 377/42; 328/14; 307/529; 364/718

[56] References Cited

U.S. PATENT DOCUMENTS

| | | | |
|---|---|---|---|
| 4,225,936 | 9/1980 | Lesche | 364/718 |
| 4,295,098 | 10/1981 | Crowley | 328/14 |
| 4,484,296 | 11/1984 | Treise et al. | 328/14 |
| 4,556,869 | 12/1985 | Thomson | 328/14 |
| 4,695,804 | 9/1987 | Bardl et al. | 328/14 |
| 4,710,891 | 12/1987 | Debus et al. | 364/718 |
| 4,943,779 | 7/1990 | Pedersen et al. | 328/14 |

Primary Examiner—John S. Heyman
Attorney, Agent, or Firm—Michael J. McGowan; Prithvi C. Lall; Michael F. Oglo

[57] ABSTRACT

A digital calibration circuit provides ⅓ octave center frequencies substantially in the range of 50 Hz-12.5 kHz (25 tones) simultaneously at the output at repeatable levels. The system converts digital data to an analog representation for use in calibrating hydrophones. The calibration circuit is comprised of a clock section, a counting section, a clearing section, a data storage/transfer section, and a signal conditioning section. The information that is provided to the output in analog form is stored in digital form in an EPROM within the data storage/transfer section.

6 Claims, 3 Drawing Sheets

DIGITAL CALIBRATION CIRCUIT EMPLOYING COMPOSITE SINE WAVE SIGNALS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to a calibration circuit. More particularly the system generates a plurality of frequencies simultaneously at repeatable levels for the calibration of hydrophones. (2) Description of the Prior Art Prior to the present invention the time required by the instrumentation to perform the hydrophone calibration in a Deployable Noise Measurement (DNM) Program was lengthy and costly. The Deployable Noise Measurement Program processes torpedo radiated noise of the Navy's research and development torpedoes. The calibration of the hydrophones costs ship time and labor hours during the conduct of an operation.

The past Deployable Noise Measurement Program system used a programmable analog signal generator to separately send twenty-five sequential ⅓-octave band (center frequency) tones to the calibration pad, hereinafter called CAL PAD of hydrophones during the calibration. The tones started at 50 Hz and ended at 12.5 kHz. Each tone was sent for a duration of 30 seconds. The result was a relatively slow calibration procedure for each hydrophone. Each hydrophone has two channels; a direct signal channel and an F.M. channel; to cover the appropriate range and signal to noise ratio. If two hydrophones are used, each with two channels, it takes about one hour to calibrate the two hydrophones at 25 different frequencies in the 50 Hz–12.5 kHz range. This prior art method also requires the tape playback calibration to be synchronized.

SUMMARY OF THE INVENTION

Accordingly, it is a general purpose and object of the present invention to provide an improved digital calibration circuit that provides an analog output signal. It is a further object that the output signals are ⅓-octave center frequencies substantially in the range of 50–12.5 kHz (twenty-five tones) simultaneously at repeatable levels for calibrating hydrophones. It is a further object that the circuit is made with all standard state-of-the-art components.

These and other objects are accomplished with the present invention by providing a system in which a discrete digital time sequence of synchronous sine waves of twenty-five ⅓ octave center frequencies in the form of a binary data file having 4000 sample or data points within the range of 0–255 (i.e. $2^0$ to $2^8$ range) decimal are sequentially stored in a four kbyte EPROM. The 4000 sample data points are sequentially addressed and converted to analog signals for hydrophone calibration. The data is addressed at a rate of 32 kHz. Therefore, the entire process repeats every 0.125 seconds (8 Hz).

The T0 timing signal controls the counters count. The count will increment each time T0 has a rising edge (every 0.000031525 s). To is low for 1 clock plus (3.90625e-06 s). When T0 rises, T1 goes low for one clock pulse. During this time, the information contained within a location in the eprom is addressed (X=unstable address lines). When T1 rises the eprom's address lines are stable and become enabled for 3 clock pulses (until T5 goes low) and data reaches the input lines of the latch. One clock pulse after T1 rises to a high level, T3 reaches a low level and remains at this level for one clock pulse. During this time, the data on the latch's input lines is passed to the latch's output lines which are connected to the digital-to-analog converter's input lines. One clock pulse after T3 rises, T5 reaches a low level and the eprom is disabled as mentioned above. T5 stays at a low level for 1 clock pulse. During this time, the data at the digital-to-analog converter's output is enabled.

This entire process will repeat in 2 clock pulses after T5 rise to a high level. This entire process is repeated 4000 times; once for each sample point that makes up the composite waveform where the amplitude value corresponding to each of these 4000 sample points is stored in the eprom. It should be noted that T2, T4, T6, T7 are used as buffer time zones and not for any time synchronization.

DESCRIPTION OF THE PREFERRED EMBODIMENT

A digital analysis and digital signal processing software (DADISP) package was used to create a 4000 sample point composite digital sequence. The time between sample points (Tsample) is $3.125 \times 10^{-5}$ sec. which equates to a sample frequency (Fsample) of 32 kHz. The sequence comprises twenty-five coherently summed, DADISP generated, discrete time sine waves with each discrete sine wave being a ⅓-octave center frequency. The sequence is then scaled by DADISP such that the amplitudes for each of the 4000 points are within the range of 0–255, decimal (i.e. $2^0$–$2^8$ range). The decimal amplitude levels for each of the 4000 sample points are then converted to binary (digital) amplitude levels. The DADISP software allows the discrete time digital sequence to then be stored in a binary data file.

The present invention through the use of a PC compatible, software interactive EPROM programmer sequentially stores this discrete time digital sequence (binary data file) in a 4 kbyte EPROM 12.

Figure 1:
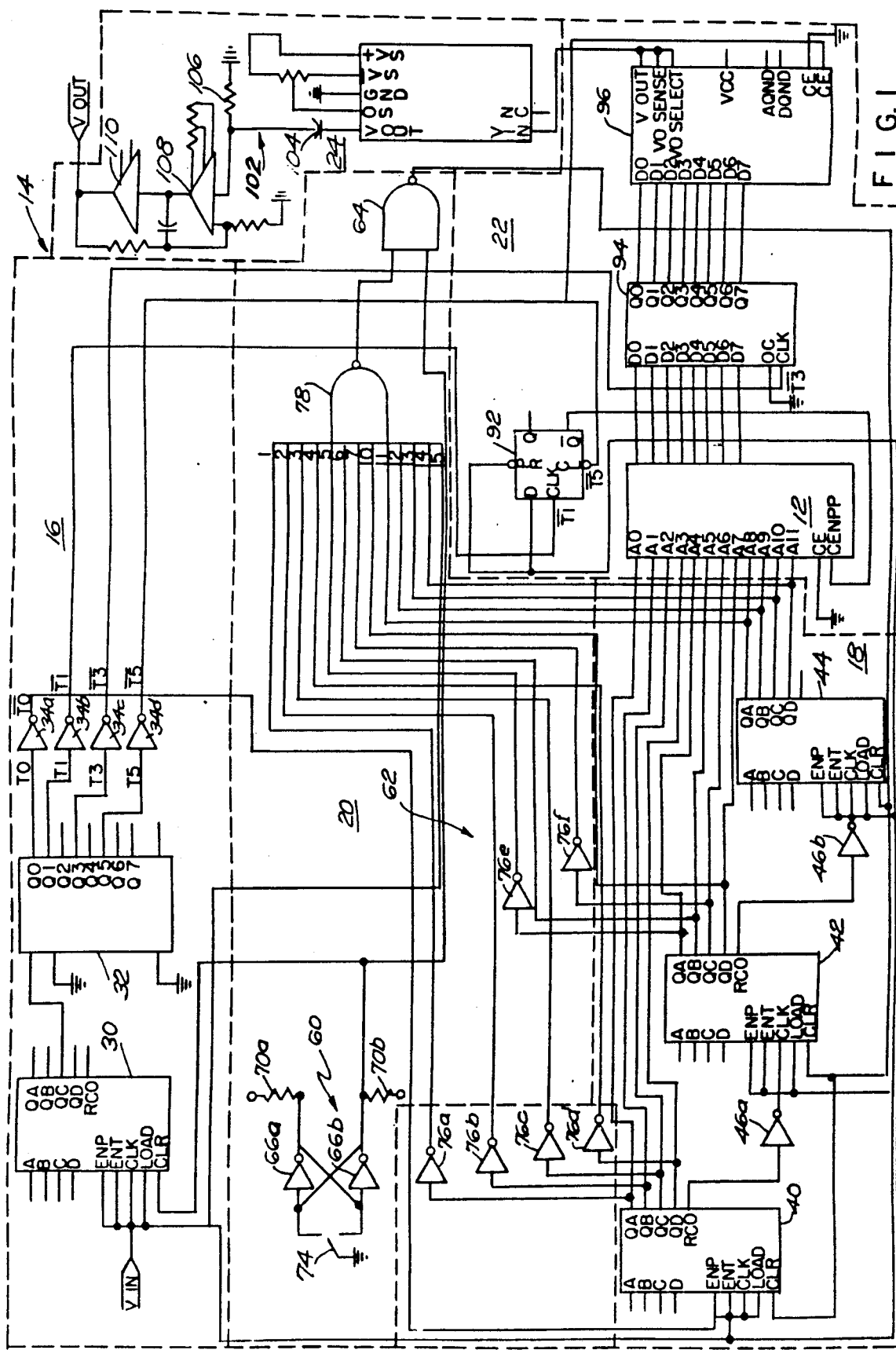
FIG. 1 is a schematic diagram of a digital calibration circuit in accordance with the present invention.
Figure 2:
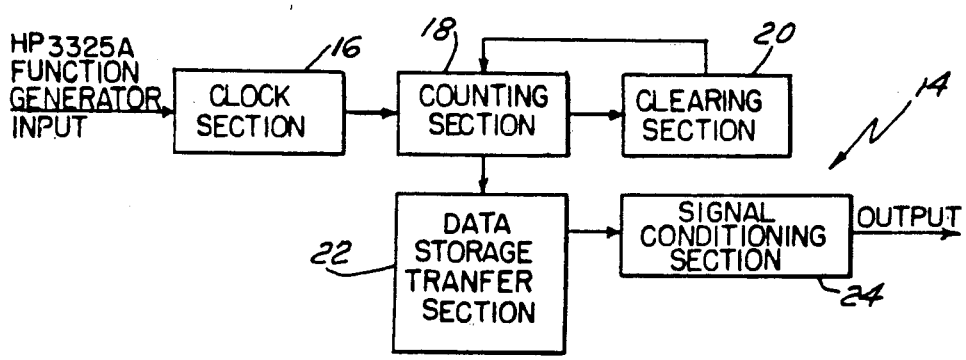
FIG. 2 is a block diagram of the calibration circuit shown in FIG. 1.

Refer now to FIGS. 1 and 2 wherein it is shown that the calibration circuit 14 is comprised of five sections, the clock section 16, the counting section 18, the clearing section 20, the data storage/transfer section 22, and the signal conditioning section 24.

Figure 3:
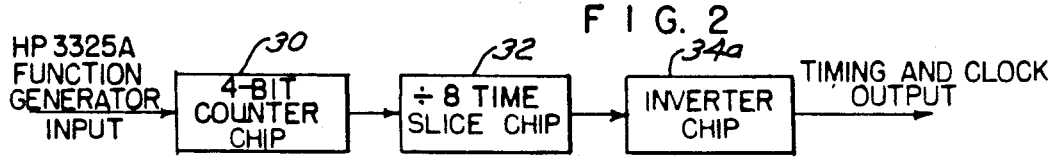
FIG. 3 is a block diagram of the clock section shown in FIGS. 1 and 2.
Figure 8:
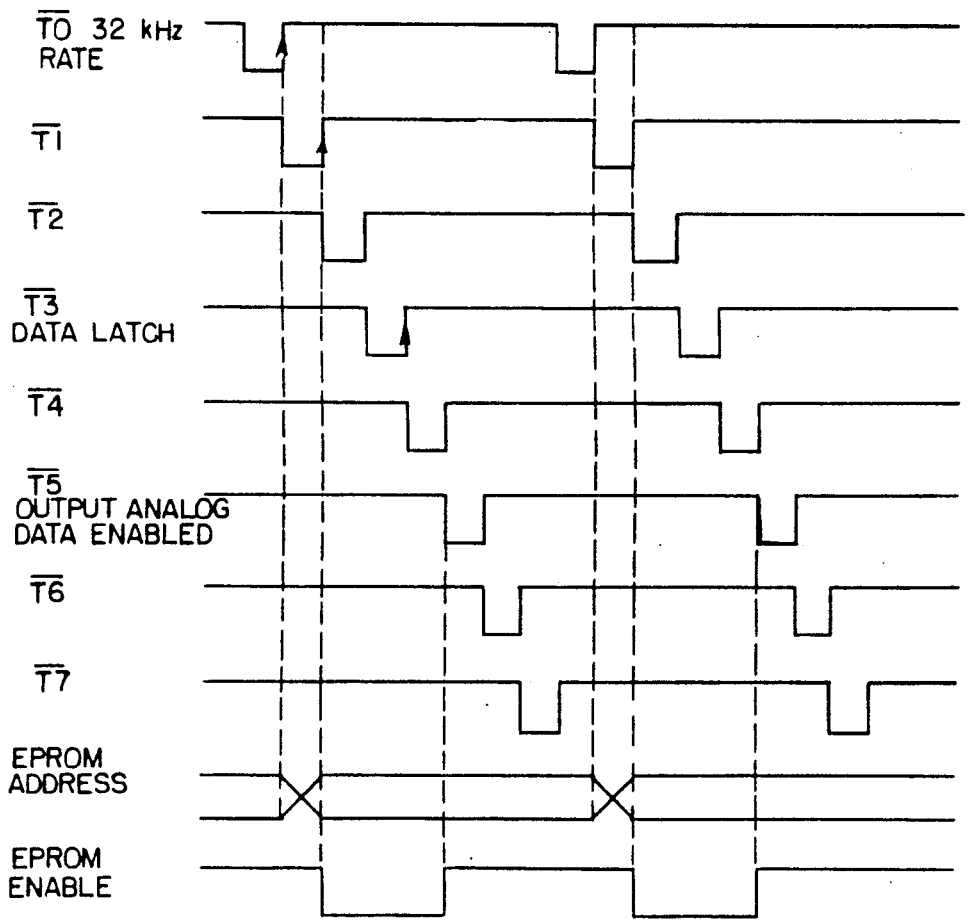
FIG. 8 is a timing diagram generated in the clock section of FIGS. 1, 2, and 3.

Refer now to FIGS. 1, 2, and 3 for a description of the clock section 16. The clock section 16 is comprised of an external HP3325A function generator that is set to a frequency of 2.048 MHz. The 2.048 MHz signal provides an input $V_{in}$ to a 74LS163 4-bit counter 30 that divides the input frequency by eight to provide a 256 kHz clock frequency. This 256 kHz clock signal is fed to the input of an CMOS 4022 divide by eight time slice chip 32 in order to produce the desired clock rate of 32 kHz and synchronization for the circuit 14. The time slice chip 32 creates synchronous outputs T0 to T7. The T0 output of the time slice chip serves as the 32 kHz trigger. The T0 signal is fed to a 74LS04 invertor 34a and its output is sent to the counting section 18. Three of the time slice chip's 32 other outputs are fed to respective 74LS04 invertors 34b-d. The inverted signals of invertors 34b-d, are then used to correctly synchronize the data transfers in the data storage/transfer section 22 of the circuit 14. The timing diagram is shown in FIG. 8.

Figure 4:
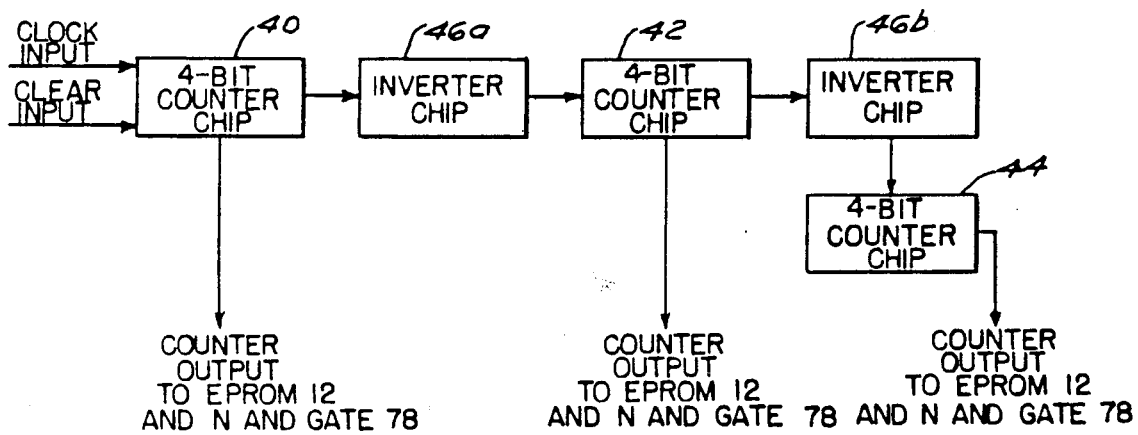
FIG. 4 is a block diagram of the counting section shown in FIGS. 1 and 2.

Refer now to FIGS. 1, 2, and 4 for a description of the counting section 18. The counting section 18 comprises three 74LS161 4-bit counter chips with direct clear 40, 42 and 44. The three counters 40, 42, and 44 are cascaded together using two 74LS04 invertors 46a and 46b. Each pulse T0 from invertor 34a allows the counters 40, 42 and 44 to count upward sequentially until 4000 decimal is reached. The counters 40, 42 and 44 are then cleared by the clearing section 20 and the counting sequence resets. The output of the counters 40, 42, and 44 goes to Erasable Programmable Read Only Memory (EPROM) 12 in the data storage/transfer section 22. At each trigger pulse, this output of the counters 40, 42, and 44 increments the address of the EPROM 12 from 0 to 4000 decimal.

Figure 5:
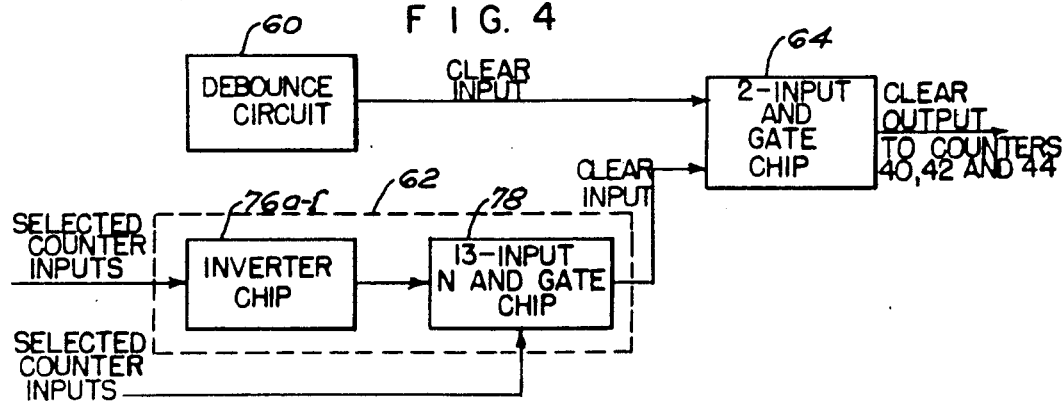
FIG. 5 is a block diagram of the clearing section shown in FIGS. 1 and 2.

Refer now to FIGS. 1, 2, and 5 for a description of the clearing section 20. The clearing section 20 is comprised of two circuits, a debounce circuit 60 and a clear circuit 62. Both circuits 60 and 62 supply signals to a 74LS08 2-input AND gate chip 64. The debounce circuit 60 is comprised of 74LS04 invertors 66a and 66b, associated resistors 70a and 70b, and momentary switch 74. The function of the debounce circuit 60 is to clear the count sequence at the instant that the switch 74 is pressed. The clear circuit 62 clears the counters 40, 42, and 44 when the count reaches 4000 decimal. This clear circuit 62 comprises 74LS04 invertors 76a-f and a 74S133 thirteen input NAND gate chip 78. The outputs of the three counter chips 40, 42, and 44, in addition to going to the EPROM 12 as mentioned above, are connected to the NAND gate 78, some through invertors 76a-f as shown in FIG. 1, so as to produce a clear signal when 4000 decimal is reached. This clear signal is the output for clear circuit 62. The clears for each of the two circuits 60 and 62 are connected to 2-input AND gate chip 64 whose output is connected to serve as the ultimate clear signal for the three counters 40, 42, and 44.

Figure 6:
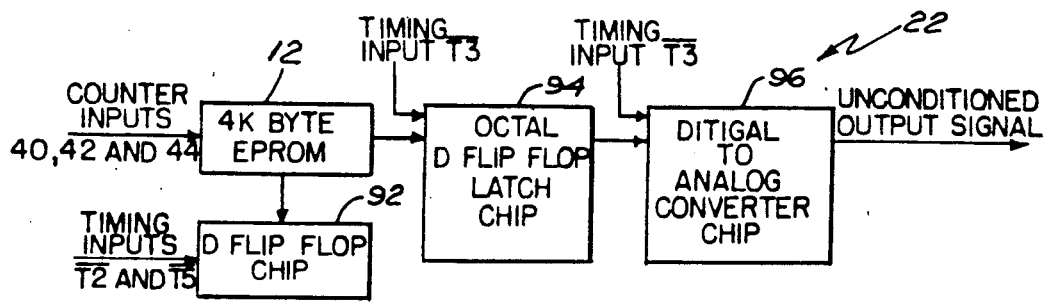
FIG. 6 is a block diagram of the data storage/transfer section shown in FIGS. 1 and 2.

Refer now to FIGS. 1, 2, and 6 for a description of the data storage/transfer section 22. The data storage/transfer section is comprised of four chips, a 2732A 4 kbyte EPROM 12, a 74LS74 D-flip flop 92, a 74LS374 octal D-flip flop latch 94, and and an AD558 digital to analog converter 96.

The 4 kbyte EPROM 12 has a 4000 sample digital sequence created by DADISP stored in it. This sequence is the coherent sum of twenty five sine waves of ⅛-octave center frequencies sampled at a 32 kHz rate. The EPROM 12 works in the following way. Each trigger pulse increments the counters 40, 42, and 44 which point to one of the 4000 addresses of the EPROM 12 where data has been stored. At every appropriate time interval, T1 the data stored at this address (location) is output on eight data lines and is sent to the D-flip flop latch 94.

This data transfer of the EPROM 12 is Controlled by D-flip flop chip 92 which enables the EPROM 12 data output. In addition, every time interval, T5, the D-flip flop 92 disables the output enable of the EPROM 12, thus removing the data on the output. Therefore, the EPROM 12 is enabled at time interval T1 and remains enabled until time interval T5 is reached. The timing diagram of FIG. 8 also depicts the EPROM's 12 address line and the EPROM's 12 enable line.

The EPROM's 12 data is sent from D-flip flop 92 to octal D-flip flop latch 94. The purpose of this chip 94, as the name implies, is to latch the output of the EPROM 12 before it is sent to the D/A 96 inputs. The data transfer occurs at every time interval, T3.

The outputs of the latch 94 are sent to the digital to analog converter 96 at time interval, T5. The digital to analog converter 96 then produces a continuous time waveform from the 8-bit bytes. It produces a voltage in the range of 0–2.55 volts peak that represents the coherent summation of twenty five sine waves of ⅛-octave center frequencies in the range 48 Hz–12.496 kHz.

Figure 7:
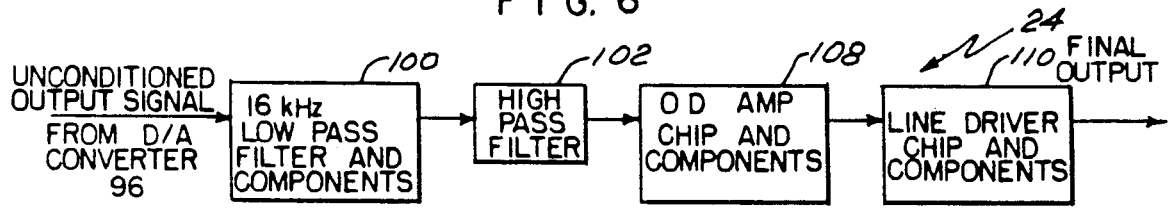
FIG. 7 is a block diagram of the signal conditioning section shown in FIGS. 1 and 2.

Refer now to FIGS. 1, 2, and 7 for a description of the signal conditioning section 24. The signal conditioning section 24 comprises a 16 kHz low pass filter 100, a 10 Hz passive high pass filter 102 comprised of grounded serially connected capacitor 104, and resistor 106, an OP27 amplifier chip 108, and an LT1010 unity gain buffer (line driver) 110.

The 16 kHz low pass filter 100 is connected to the output of the D/A converter 96 for filtering the harmonics of the twenty-five ⅛-octave tonals. This low pass filter 100 is elliptical with a 90 dB/octave rolloff.

The 10 Hz high pass filter 102 is connected to the output of the low pass filter 100, and makes the signal bipolar. This high pass filter 102 has a 6 dB/octave rolloff.

The OP27 amplifier chip 108 is connected to receive the output signal of the high pass filter 102 and amplifies this signal to the appropriate signal level so that the signal level at the CAL PAD input to the hydrophone (not shown) is 10.8±.7 dBv rms total.

The LT1010 line driver 110 is used to drive and isolate the capacitive load of a DNM cable (not shown).

There has therefore been described a new calibration circuit 14 that is capable of calibrating a hydrophone in a matter of a few minutes as opposed to the old calibration procedure that took one hour for each hydrophone. A twenty-five tone signal is now sent to the CAL PAD instead of sending twenty-five discrete tones that each last thirty seconds. There is also no need for the tape playback calibration to be synchronized.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A digital calibration circuit for audio range sensing equipment comprising:
   a clock section including timing means for providing time sequenced discrete output signals on a plurality of output terminals, with each of said output terminals providing a fractional number of said plurality of discrete output signals in time sequenced rotation with the other of said output terminals;
   a counting section including counting means connected to receive discrete signals from one of said plurality of clock section output terminals for counting upward upon receipt of each discrete signal to a predetermined number and then repeatedly counting upward over again, said counting means for providing output signals indicative of the count;
   a clearing section including clearing means connected to receive said output signals indicative of the count from said counting means, said clearing means for providing an output signal upon receipt of the output signal indicative of said predetermined number;
   a data storage/transfer section connected to receive said output signals indicative of the count from said counting means, said data storage/transfer section having a sample digital sequence stored in a number of addresses, said number of addresses being equal to said predetermined number, said data storage/transfer section having storage/transfer means for supplying a plurality of sine wave signals indicative of analog representations of the digital sample at the address pointed to for a predetermined period of time; and
   a signal conditioning section connected to receive said plurality of sine wave signals indicative of analog representations from said storage/transfer means, said signal conditioning section having signal conditioning means for filtering sine harmonics and making a bipolar composite of said plurality of sine wave signals indicative of said analog predetermined number of analog representations and providing an output signal thereof, whereby simultaneous calibrations of said audio range of said sensing equipment is effected.

2. A digital calibration circuit according to claim 1 wherein said timing means further comprises:
   a counter for dividing an input frequency and supplying an output that is a division of said input frequency; and
   a time slicer connected to receive signals from the output of said counter, said time slicer having a plurality of output terminals, said time slicer having time slicing means for slicing the received signals and for providing the sliced signals in rotation on said plurality of output terminals.

3. A digital calibration circuit according to claim 2 wherein said counting means further comprises a plurality of counters and inverters with said counters cascaded and separated from each other by one of said plurality of inverters.

4. A digital calibration circuit according to claim 3 wherein said clearing means further comprises:
   a gate;
   a debounce circuit connected to said counter and said gate, said debounce circuit having switching means with a manual switch for providing a clear signal upon actuating said manual switch;
   a clear circuit connected to receive signals from said plurality of counters, said clear circuit providing an output signal upon said received signals reaching a predetermined count; and
   said gate connected to receive said clear circuit's output signal, said gate further connected to provide a clear signal to said counters upon receipt of an enabling signal from at least one of said debounce circuit and said clear circuit.

5. A digital calibration circuit according to claim 4 wherein said storage/transfer means further comprises:
   an EPROM connected to receive signals from said counter, said EPROM supplying on a plurality of output terminals EPROM outputs of said address data pointed to by said counters;
   a D-flip flop chip connected to said EPROM for providing signals to said EPROM for enabling and disabling said EPROM outputs;
   a D-flip flop latch connected to receive the output of said EPROM to latch said EPROM outputs and provide latched outputs; and
   a digital to analog converter connected to receive said latched outputs and for converting said latched outputs to continuous analog signal levels.

6. A digital calibration circuit according to claim 5 wherein said signal conditioning means further comprises:
   a low pass filter connected to said digital to analog converter to receive said continuous analog signal levels, said low pass filter operating on said received signal and providing an output that filters the harmonics of said received signal;
   a high pass filter connected to receive said output of said low pass filter, said high pass filter operating on said received signal levels and providing an output that is bipolar; and
   an amplifier and line driver serially connected to receive said high pass filter output to amplify the received signal to the required output level and to drive and isolate the capacitive load of the output.

* * * * *